US008869289B2

(12) United States Patent
Dubhashi et al.

(10) Patent No.: US 8,869,289 B2
(45) Date of Patent: Oct. 21, 2014

(54) SOFTWARE APPLICATION VERIFICATION

(75) Inventors: Kedarnath A. Dubhashi, Redmond, WA (US); John Bocharov, Seattle, WA (US); Hany Farag, Issaquah, WA (US); Gilles Khouzam, Bothell, WA (US); Kiran Kumar, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1247 days.

(21) Appl. No.: 12/360,943

(22) Filed: Jan. 28, 2009

(65) Prior Publication Data

US 2010/0191974 A1    Jul. 29, 2010

(51) Int. Cl.
*G06F 7/04*    (2006.01)
*G06F 17/30*    (2006.01)
*H04N 7/16*    (2011.01)
*H04L 9/32*    (2006.01)
*G06F 21/12*    (2013.01)
*G06F 21/10*    (2013.01)

(52) U.S. Cl.
CPC ......... *H04L 9/3273* (2013.01); *H04L 2209/603* (2013.01); *H04L 9/3247* (2013.01); *G06F 21/121* (2013.01); *G06F 21/10* (2013.01)
USPC .............................................. 726/26; 726/27

(58) Field of Classification Search
CPC ... G06F 21/10; G06F 21/121; H04L 2209/60; H04L 2209/603; H04L 2209/605; H04L 9/3247; H04L 9/3273
USPC ....................................... 726/26–29; 380/200
See application file for complete search history.

(56) References Cited

U.S. PATENT DOCUMENTS

| 7,103,574 | B1 | 9/2006 | Peinado et al. | |
| 7,308,717 | B2 | 12/2007 | Koved et al. | |
| 8,286,235 | B2 * | 10/2012 | Kim et al. | 726/21 |
| 2002/0108049 | A1 * | 8/2002 | Xu et al. | 713/193 |
| 2003/0217011 | A1 | 11/2003 | Peinado et al. | |
| 2003/0226012 | A1 * | 12/2003 | Asokan et al. | 713/156 |
| 2004/0243808 | A1 * | 12/2004 | Ishiguro et al. | 713/176 |
| 2005/0010757 | A1 * | 1/2005 | Bosler | 713/156 |
| 2005/0131831 | A1 | 6/2005 | Fieldson | |
| 2005/0278787 | A1 | 12/2005 | Naslund et al. | |

(Continued)

FOREIGN PATENT DOCUMENTS

EP        1798656 A2    6/2007
JP        2000155735 A    6/2000

(Continued)

OTHER PUBLICATIONS

"International Search Report", Mailed Date: Jul. 29, 2010, Application No. PCT/US2010/020780, Filed Date: Jan. 12, 2010, pp. 9.

(Continued)

*Primary Examiner* — Kambiz Zand
*Assistant Examiner* — Jing Sims
(74) *Attorney, Agent, or Firm* — Micah Goldsmith; Leonard Smith; Micky Minhas

(57) ABSTRACT

Various embodiments for software application verification are disclosed. Software application verification applies digital rights management to applications that run protected content on a playback device. In this way, protected content may be provided to approved applications and withheld from applications that have not been approved to run the protected content.

19 Claims, 5 Drawing Sheets

(56) References Cited

U.S. PATENT DOCUMENTS

| | | | |
|---|---|---|---|
| 2005/0278793 A1* | 12/2005 | Raley et al. | 726/28 |
| 2005/0289072 A1* | 12/2005 | Sabharwal | 705/59 |
| 2006/0083369 A1* | 4/2006 | Lee | 380/28 |
| 2006/0294378 A1* | 12/2006 | Lumsden et al. | 713/171 |
| 2007/0136207 A1* | 6/2007 | Davydov et al. | 705/57 |
| 2008/0065550 A1* | 3/2008 | Zhu et al. | 705/51 |
| 2008/0086777 A1 | 4/2008 | Sanchez | |
| 2008/0098481 A1* | 4/2008 | Lee et al. | 726/26 |
| 2008/0114693 A1 | 5/2008 | Jogand-Coulomb et al. | |
| 2008/0148363 A1* | 6/2008 | Gilder et al. | 726/4 |
| 2008/0168568 A1* | 7/2008 | Brodersen et al. | 726/30 |
| 2008/0282357 A1* | 11/2008 | Sharpe | 726/27 |
| 2009/0019551 A1* | 1/2009 | Haga et al. | 726/27 |
| 2009/0041242 A1* | 2/2009 | Yang et al. | 380/255 |
| 2009/0178093 A1* | 7/2009 | Mitsuji et al. | 725/104 |
| 2010/0042830 A1* | 2/2010 | Shao et al. | 713/156 |
| 2010/0180130 A1* | 7/2010 | Stahl et al. | 713/193 |

FOREIGN PATENT DOCUMENTS

| | | | |
|---|---|---|---|
| JP | 2005318538 A | | 11/2005 |
| JP | 2006503369 A | | 1/2006 |
| JP | 2006050355 A | | 2/2006 |
| JP | 2007018365 A | | 1/2007 |
| JP | 2008271564 A | | 11/2008 |
| KR | 1020040100848 A | | 12/2004 |
| KR | 1020080103599 A | | 11/2008 |
| WO | 2006065633 A3 | | 10/2006 |
| WO | 2007077362 A2 | | 7/2007 |
| WO | 2008100264 A2 | | 8/2008 |

OTHER PUBLICATIONS

Iler, David, "DRM: The Guardian and Protector of Digital Media", retrieved at <<http://www.cedmagazine.com/drm-the-guardian-and-protector.aspx>>, Contributing Editor CedMagazine.com—Apr. 1, 2002, pp. 3.

European Patent Office, Extended European Search Report of EP10736177, Germany, Jun. 6, 2012, 6 pages.

Open Mobile Alliance, "DRM Specification Approved Version 2.0—OMA-TS-DRM-DRM-V2 0-2 0060303-A", Mar. 3, 2006, 142 pages.

European Patent Office, European Exam Report of EP10736177, Sep. 27, 2013, Germany, 5 pages.

State Intellectual Property Office of China, Office Action of Chinese Patent Application No. 201080006315.7, Sep. 24, 2013, 12 pages.

ISA European Patent Office, Office Action of European Patent Application No. 10736177.6, Oct. 4, 2013, 5 pages.

Japan Patent Office, Office Action of Japanese Patent Application No. 2011548013, Nov. 27, 2013, 7 pages.

\* cited by examiner

SOFTWARE APPLICATION VERIFICATION

BACKGROUND

Digital Rights Management (DRM) allows content owners and distributors to not only deter unwanted copying of content but also to control how that content is used. For example, DRM allows content owners to control how many viewings are allowed for certain content, for example audio or video media data, how many copies may be made for the content, what device may receive the owned content, etc.

Currently, DRM protected content is associated with a machine, i.e. a PC, a portable device, a cellular phone, etc. This allows multiple applications on a machine to access the protected content once the machine has been granted access by a DRM system. Unfortunately, malicious users may circumvent this DRM approach and access content they are not authorized to access, change the way content is played back, etc.

One example of utilizing content in an unintended manner involves application spoofing of a Rich Internet Application (RIA). A spoofed application may be created that appears to a server like an application that is approved to access, play, store, etc., protected content. Therefore, the application may receive the content from the server and use it in a way a content owner does not intend. One example is advertisement funded video, where a content owner or distributor may intend a user to watch pre-roll advertisements, interstitial advertisements, or overlay advertisements, etc., in order to watch the premium content. Spoofed applications attempt to play only the video content without the advertisements, resulting in revenue loss for at least one party. Online banking provides another example of application spoofing where it is detrimental to allow an apparently approved RIA to use protected content in a manner not intended by the content owner, the bank, etc.

SUMMARY

Accordingly, various embodiments for software application verification are described below in the Detailed Description. Software application verification applies digital rights management to applications that run protected content on a playback device. In this way, protected content may be provided to approved applications and withheld from applications that have not been approved to run the protected content. Embodiments include client side software application verification, server side software application verification, distributed software application verification, etc.

One client side example embodiment comprises requesting playback of protected content, sending a license challenge to a digital rights management server, receiving a license response from a digital rights management server, the license response including a public key, verifying the application is signed using the public key, and if the application is signed with the public key, providing the protected content to the application for playback.

One server side example embodiment comprises receiving a license challenge from a playback device, the license challenge including an application identity such as a value computed on an application binary (for example a hash value), comparing the application identity to a list of approved applications, the list of application identities for applications that are allowed to run protected content, and providing a license response containing a license to the playback device, the license to be used to authorize an application on the playback device to receive the protected content.

This Summary is provided to introduce concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
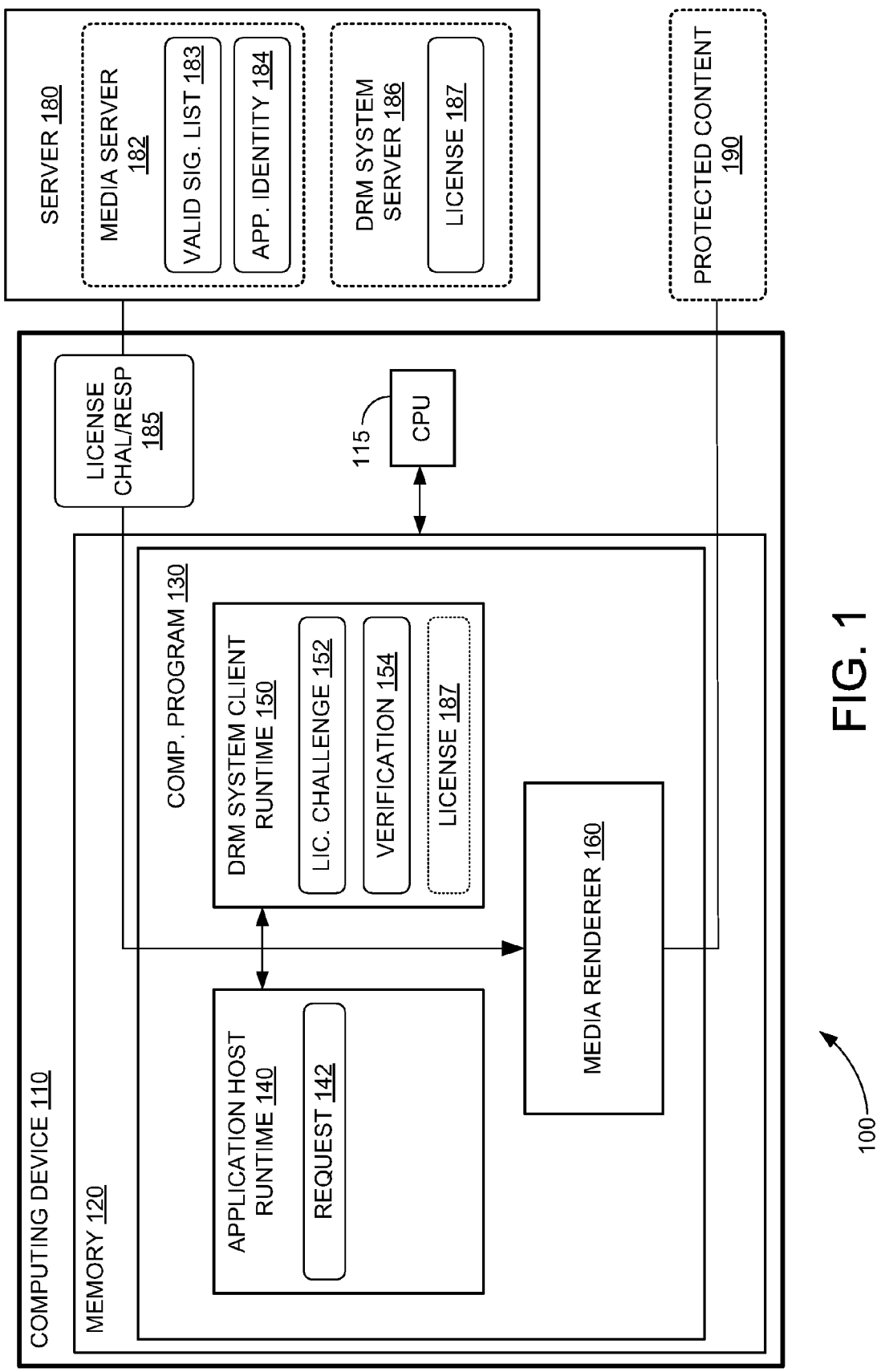
FIG. 1 shows an example of an embodiment system for software application verification for an application on a computing device.

FIG. 1 shows an example of an embodiment system 100 for software application verification for an application 140 on a computing device 110. System 100 also includes a server 180 including a media server 182 having a valid signature list 183 and a digital rights management server 186 that may contain a license to authorize an application on computing device 110 to play protected content 190. In one embodiment, computing device 110 is configured to restrict playback of protected content to applications approved by a content provider, content distributor, etc. By extending DRM techniques to applications that play protected content, content owners have more control over how protect content is played, improving security, enforcing restrictions on advertisements and thus increasing advertisement based revenue, etc. We now describe example embodiment system 100 in more detail in the following paragraphs.

In the illustrated embodiment, computing device 110 includes a processor 115, a memory 120, at least one computer program 130, and a media renderer 160, which may be in software or hardware. Computing device 110 further includes an application host runtime, also called an application 140, configured to play protected content, and a digital rights management system client runtime, also called a digital rights management module 150, in communication with the application 140.

In response to a request 142 to play protected content from the application 140, the digital rights management module 150 is configured to send a license challenge 152 to a digital rights management server 186, and to receive a license response 185 including license 187 having a public key that authorizes the application 140 to play the protected content 190 wherein once the application is verified 154 using the public key, the digital rights management module 150 allows the application 140 to play the protected content 190. For example, the digital rights management module 150 may be configured to prevent protected content from playing on a spoofed application, to enforce playback rules on the application, etc. Other embodiments may utilize other identifying information or security approaches than a public key. For example, other suitable approaches may use identifying information to authorize an application to play protected content without using public key cryptography. In some embodiments, the playback rules may enforce at least one of pre-roll advertising, interstitial advertising, or overlay advertising, but other embodiments are not so limited.

In some embodiments, the digital rights management module 150 may be configured to store the license 187 for offline verification of the application 140, wherein the application 140 may be authorized to play protected content 190 while not being in communication with the digital rights management server 186. In some embodiments, a public key that authorizes the application 140 to play protected content 190 may have also been used to sign the application 140 prior to a license challenge 152 being sent to a digital rights management server 186. For example, the application 140 may be verified if the public key in the license 187 matches a private key used to sign the application. But other embodiments are not so limited and may utilize application verification approaches that do not use public keys, such as a code including a policy that states which applications are allowed to access protected content, as a non-limiting example.

Some embodiments may provide service side verification, for example where a digital rights management server examines an application identity before issuing a license to play protected content. Embodiment server side approaches are described in more detail below with reference to FIGS. 4-5.

Figure 2:
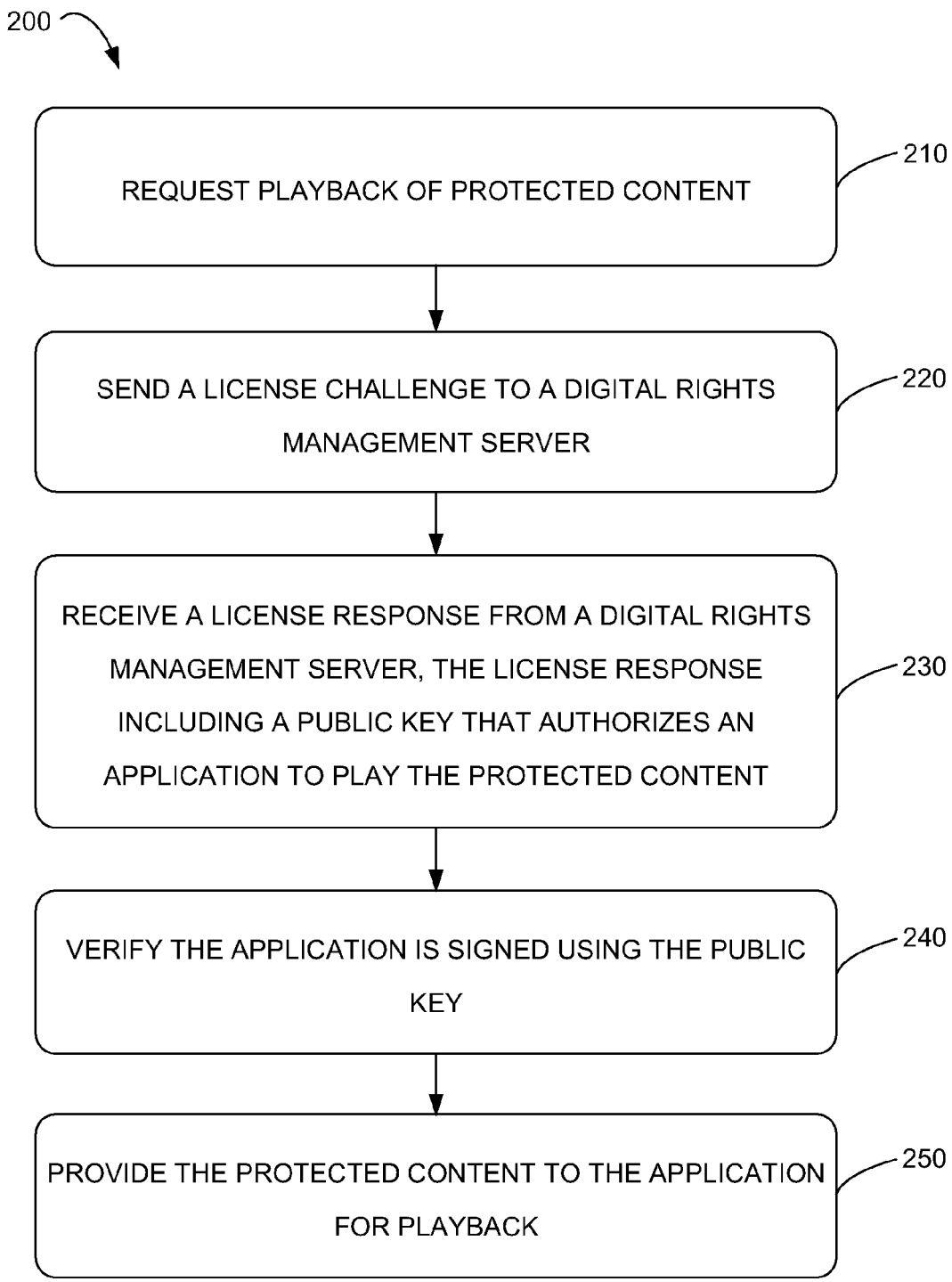
FIG. 2 shows a process flow depicting an embodiment of a method for client side software application verification.

Continuing with the Figures, FIG. 2 shows a flow diagram of an embodiment of a method 200 for client side software application verification. First, as indicated in block 210, method 200 comprises requesting playback of protected content. Method 200 also comprises sending a license challenge to a digital rights management server as indicated in block 220. In this way, a license challenge including an application identity may be first sent to the media server and the media server can consult a valid list of application identities for applications that are allowed to play protected content. If an application is approved to play protected content, the media server can forward the license challenge including a request for the digital rights management server and the digital rights management server may then place a corresponding public key to an application in the approved signature list. In one embodiment, a server may include both a media or information server and a digital rights management server.

Next, method 200 comprises receiving a license response from the digital rights management server, the license response including a license having a public key that may be used to verify an application is authorized to play protected content, as indicated at 230. In some embodiments, a private key that matches the public key that was used for application verification and authorization may have been used to sign the application prior to the license challenge. Additionally, method 200 may further comprise storing the license for offline verification of the application.

Method 200 also comprises verifying, using the public key, that the application is correctly signed, as indicated in block 240. Such verifying may include, but is not limited to, verifying the application is signed, verifying the signature is correct, and verifying a private key used to sign the application matches a public key in the license.

Next, method 200 comprises and providing the protected content to the application for playback, as indicated at 250. In some embodiments, providing the protected content to the application for playback further comprises preventing the protected content from playing on a spoofed application. Additionally, method 200 may further comprise enforcing playback rules on an application playing the protected content. In one example, enforcing playback rules may include at least one of enforcing playback of pre-roll advertising, interstitial advertising, or overlay advertising.

Figure 3:
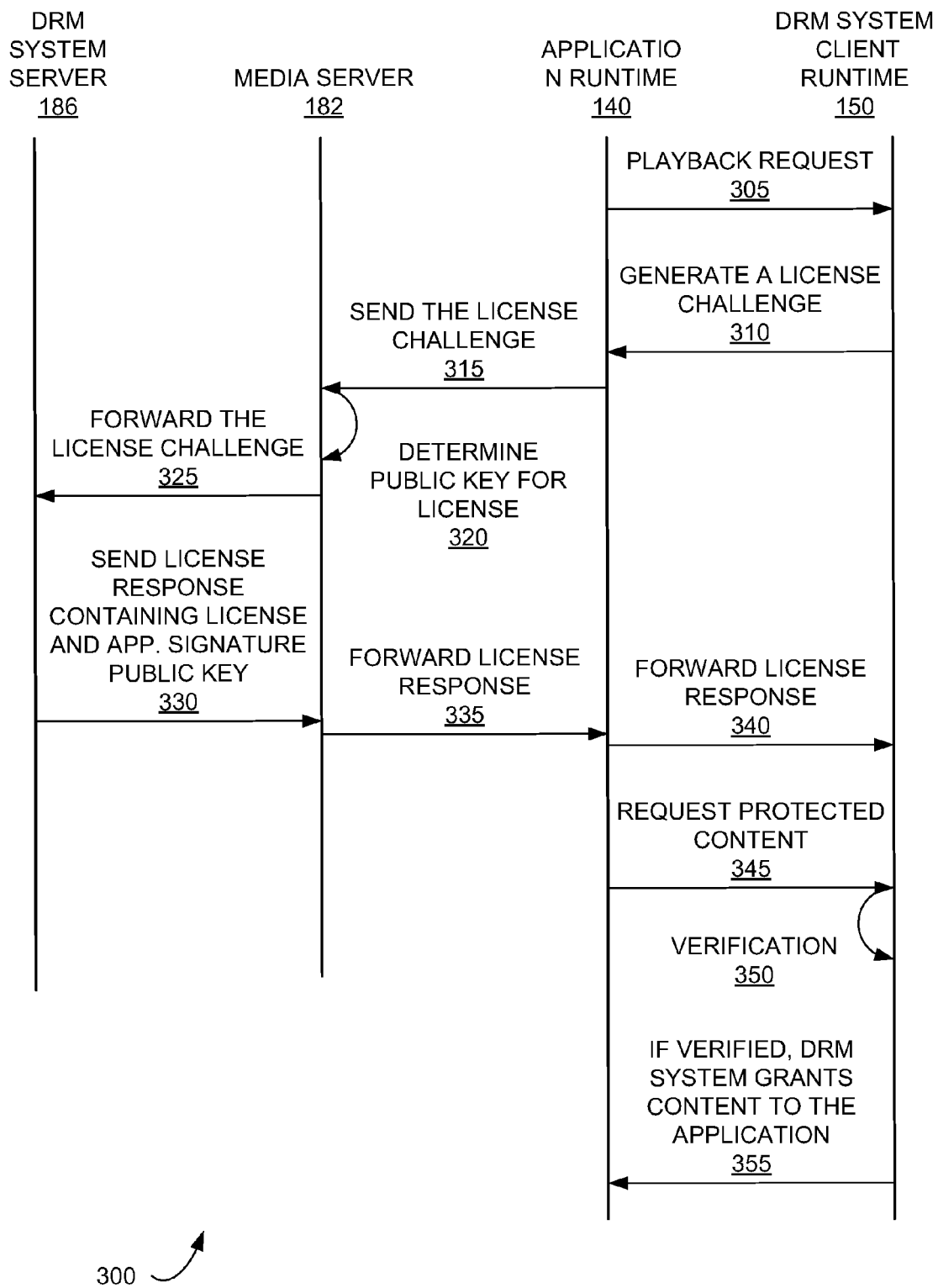
FIG. 3 shows a signaling diagram of one embodiment of a method for client side software application verification.

FIG. 3 shows a signaling diagram 300 of a detailed embodiment of a method for client side software application verification, as introduced generally with reference to FIG. 2. Signaling diagram 300 includes communications between runtimes operable on a client including an application runtime, also called application 140, and a DRM system client runtime, also called digital rights management module 150, and server functionality including a media server 182 and digital rights management server 186. The media server 182 and digital rights management server 186 may operate as separate programs on one server, may operate on separate servers, be distributed between a plurality of servers, etc.

Signaling diagram 300 begins with a playback request being sent from application 140 to digital rights management module 150 at 305. In one example, a user may wish to run protected content in application 140 and in response to an input from the user, the playback request is sent to the digital rights management module 150. Then, digital rights management module 150 generates a license challenge at 310 and sends it through application 140 to media server 182 at 315. Media server 182 can then consult a configuration module on the media server 182 to determine which public key to put in a license to the protected content at 320, wherein the configuration module stores which applications are allowed to play protected content.

Next, signaling diagram 300 involves the media server 182 forwarding the license challenge to the digital rights management server 186 at 325, and requests the digital rights management server 186 server to include an application signature public key in the license in response. Then, digital rights management server 186 creates the license response containing the license and the application signature public key and sends the license response to media server 182 at 330. Media server 182 then forwards the license response to application 140 at 335, which in turn forwards the license response to digital rights management module 150 at 340. In this way, when application 140 requests to play protected content at 345, digital rights management module 150 can verify application 140 using a license in the license response at 350, and if application 140 is authorized to play the protected content, the digital rights management module 150 grants the protected content to the application at 355.

Figure 4:
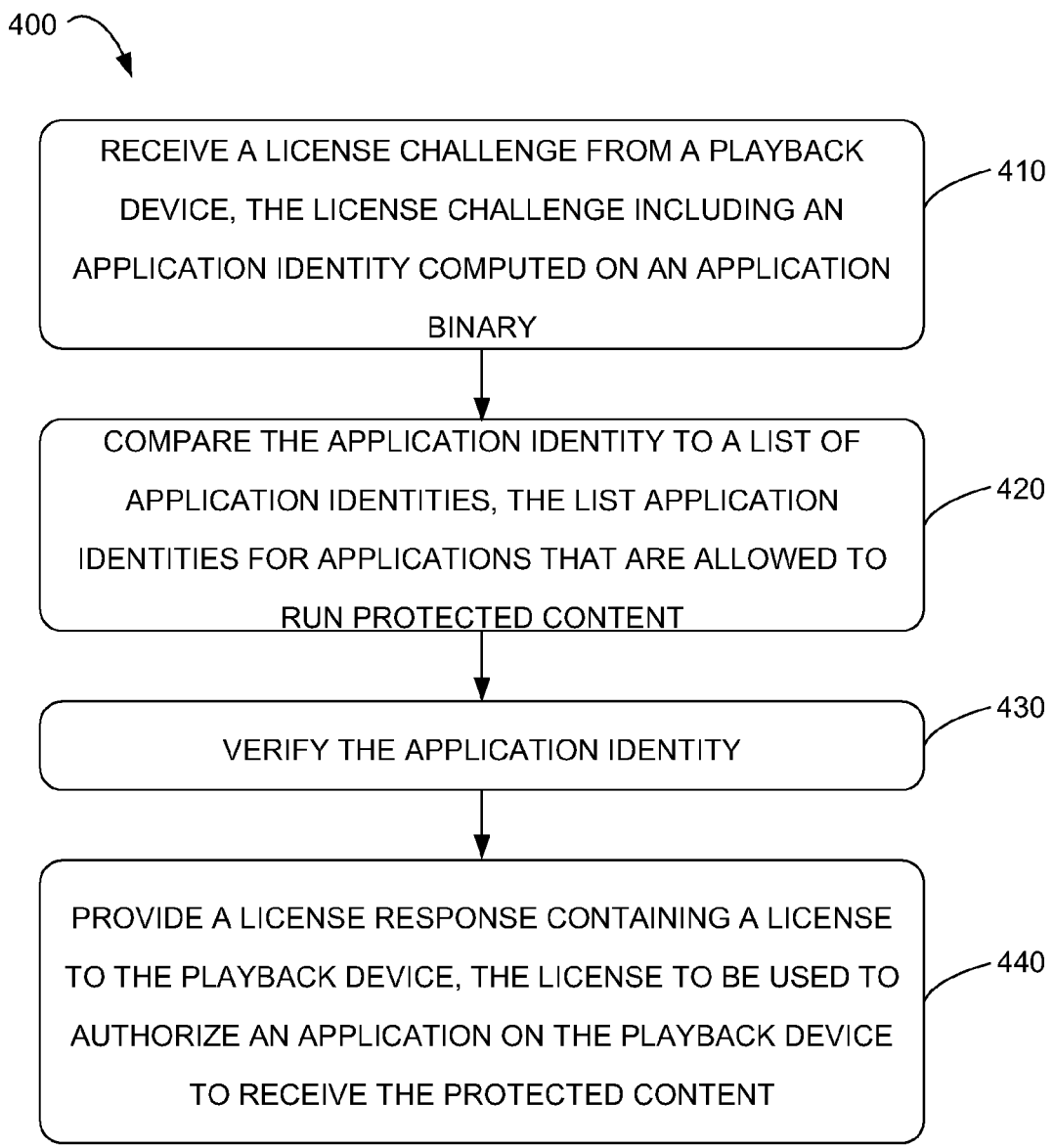
FIG. 4 shows a process flow depicting an embodiment of a method for server side software application verification.

Continuing with FIG. 4, a flow diagram of an embodiment of a method 400 for server side software application verification is illustrated. First, as indicated in block 410, method 400 comprises receiving a license challenge from a playback device, the license challenge including a signed application identity computed on an application binary. Some embodiments may further comprise computing the application identity on an application binary, and signing the application identity with a public key of a digital rights management client on the playback device.

Method 400 also comprises comparing the signed application identity to a list of application identities, the list of application identities for applications that are allowed to run protected content, as indicated in block 420. Next, method 400 comprises verifying the signed application identity, as indicated at 430.

Next, method 400 comprises providing a license response containing a license to the playback device, the license to be used to authorize an application on the playback device to receive the protected content, as indicated at 440. In some embodiments, a license may be provided to a playback device to prevent protected content from playing on a spoofed application. Additionally, a license may be provided to the playback device to enforce playback rules on an application playing the protected content. In this way, the license may be used to specify what are allowable uses of content, which applications may access content, including playing back content, exporting content, copying content, transferring content, etc. Some embodiments may further comprise the playback device then storing the license for subsequent requests to play protected content.

Figure 5:
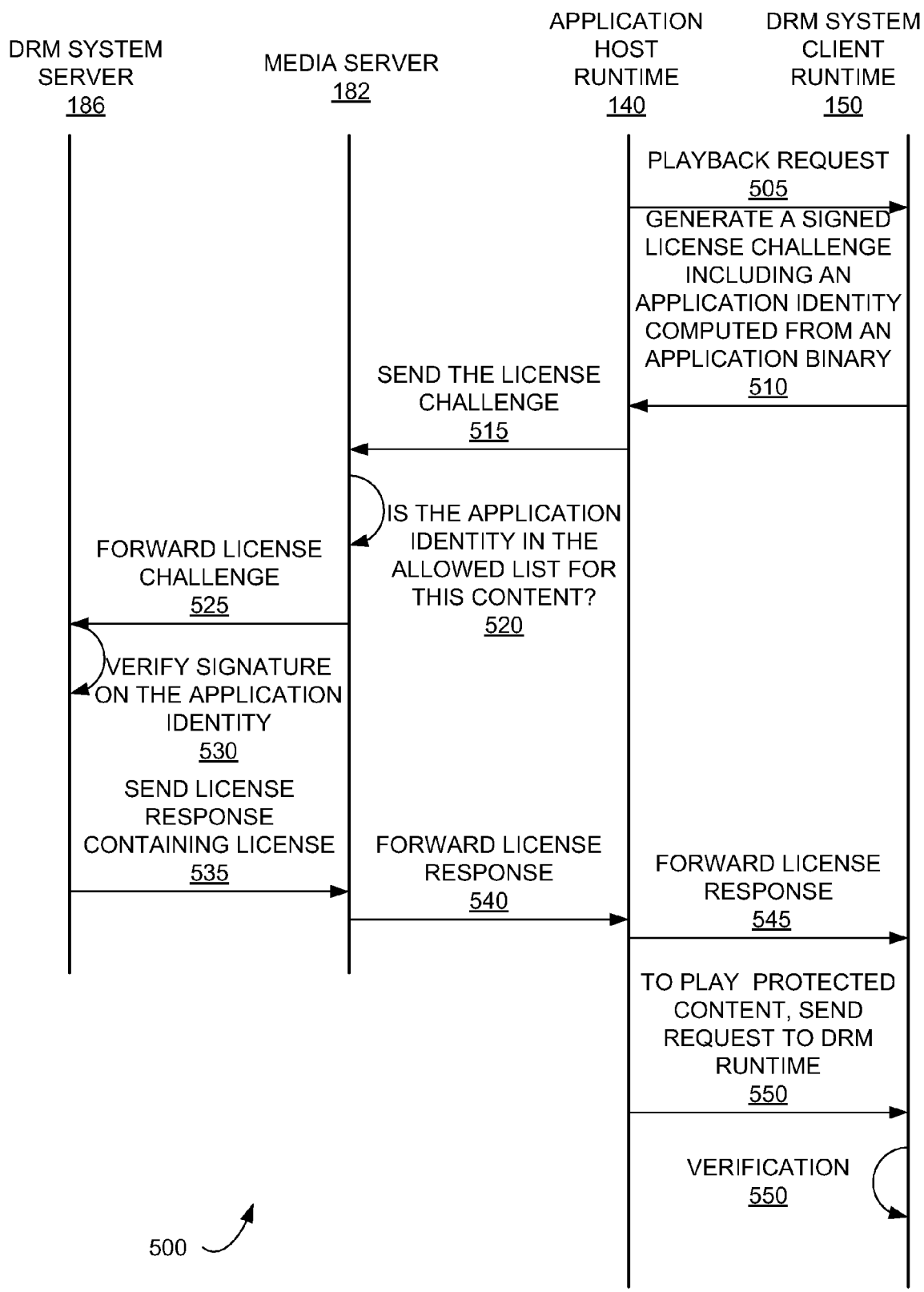
FIG. 5 shows a signaling diagram of one embodiment of a method for server side software application verification.

FIG. 5 shows a signaling diagram 500 of one embodiment of a method for server side software application verification, as introduced generally with reference to FIG. 4. Signaling diagram 500 includes communications between runtimes operable on a client including an application runtime, also called application 140, and a DRM system client runtime, also called digital rights management module 150, and server functionality including a media server 182 and a digital rights management server 186. The media server 182 and digital rights management server 186 may operate as separate programs on one server, may operate on separate servers, be distributed between a plurality of servers, etc.

Signaling diagram 500 begins with a playback request being sent from application 140 to digital rights management module 150 at 505. In this example, digital rights management module 150 then generates a license challenge, computes an application identity of the application's binary, and adds the application identity to the license challenge. Then digital rights management module 150 returns the license challenge to application 140 at 510. Application 140 then sends the license challenge to media server 182 at 515, and media server 182 in turn consults a valid signature list to see whether the application identity is included in the valid signature list for requested protected content at 520. If the application identity is not in the valid signature list, the application verification fails.

If the application identity is in the valid signature list, media server 182 forwards the full license challenge to digital rights management server 186 and asks it to validate the signature at 525. In some embodiments, the media server 182 may provide the signature verification. Digital rights management server 186 then verifies the signature on the application identity at 530, and sends a license response containing the license to media server at 535. Media server 182 then forwards the license response to the application 140 at 540, and the application 140 in turn forwards the license response to the digital rights management module 150 at 545. In this way, when application 140 requests to play protected content, it sends a request to digital rights management module 150 at 550 and the digital rights management module 150 can verify if the application is authorized to play the protected content at 550.

It will be appreciated that the embodiments described herein may be implemented, for example, via computer-executable instructions or code, such as programs, stored on a computer-readable storage medium and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, media playback devices and any other suitable device such as personal computers, servers, laptop computers, hand-held devices, cellular phones, microprocessor-based programmable consumer electronics and other protected content playback devices.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of providing protected content to an authorized application, the method comprising:
   requesting playback of protected content on a computing device from an application of the computing device;
   responsive to requesting playback of the protected content, sending a license challenge from the computing device to a digital rights management server external to the computing device, via a computer network, the license challenge including a signed application identity of the application formed by computing an application identity on an application binary;
   receiving a license response from the digital rights management server, the license response including a license having a public key that authorizes the application of the computing device to play the protected content;
   verifying the application is signed using the public key by verifying the application is signed, verifying a signature for the application is correct, and verifying a private key used to sign the application matches the public key in the license; and
   providing the protected content to the application for playback.

2. The method of claim 1, wherein providing the protected content to the application for playback further comprises preventing the protected content from playing on a spoofed application.

3. The method of claim 1, wherein providing the protected content to the application for playback further comprises enforcing playback rules on the application playing the protected content.

4. The method of claim 3, wherein enforcing playback rules further comprises at least one of enforcing pre-roll advertising, interstitial advertising, overlay advertising; or enforcing purchasing, subscription, or rental rules.

5. The method of claim 1, wherein the public key that authorizes the application to play the protected content was used to sign the application prior to the license challenge.

6. The method of claim 5, further comprising storing the license for offline verification of the application.

7. A method of providing protected content to an approved application of a playback device, the method comprising:
   receiving a license challenge from the playback device, the license challenge including a signed application identity of a selected application of a plurality of applications of the playback device, the signed application identity computed on an application binary of the selected application;

comparing the signed application identity of the selected application to a list of application identities within a server external to the playback device, the list of application identities including a plurality of application identities, each application identity indicating an application that is allowed to run protected content;

verifying the signed application identity; and providing a license response containing a license to the playback device, the license to be used to authorize the selected application on the playback device to receive the protected content.

8. The method of claim 7, wherein the license is to be used on the playback device to prevent the protected content from playing on a spoofed application.

9. The method of claim 7, wherein the license is to be used on the playback device to enforce rules on the application playing the protected content.

10. The method of claim 9, wherein the rules include at least one of enforcing pre-roll advertising, interstitial advertising, overlay advertising; or enforcing purchasing, subscription, or rental rules.

11. The method of claim 7, further comprising forming the signed application identity by computing an application identity on the application binary, and signing the application identity with a private key of a digital rights management client on the playback device.

12. The method of claim 7, wherein the signed application identity is a signed hash value.

13. A computing device for playing protected content in an approved application, the computing device comprising:

an application configured to play protected content; and a digital rights management module in communication with the application, the digital rights management module configured to send a license challenge including an application identity for the application that specifically identifies that application to a digital rights management server external to the computing device via a computer network, and to receive a license response, wherein once the application identity for the application is verified to indicate that the application is allowed to play the protected content, the digital rights management module allows the application to play the protected content.

14. The computing device of claim 13, wherein the digital rights management module is configured to prevent the protected content from playing on a spoofed application.

15. The computing device of claim 13, wherein the digital rights management module is configured to enforce playback rules on the application.

16. The computing device of claim 15, wherein the playback rules enforce at least one of pre-roll advertising, interstitial advertising, overlay advertising; or enforcing purchasing, subscription, or rental rules.

17. The computing device of claim 13, wherein the application identity is verified using a public key included in the license response that matches a private key used to sign the application prior to the license challenge.

18. The computing device of claim 17, wherein the digital rights management module is configured to store the license.

19. The computing device of claim 17, wherein the application is verified with the public key if the public key in the license matches the private key used to sign the application.

* * * * *